March 21, 1933.  C. I. HALL  1,902,327
CONTINUOUS HEAT REGULATOR
Filed Oct. 8, 1929
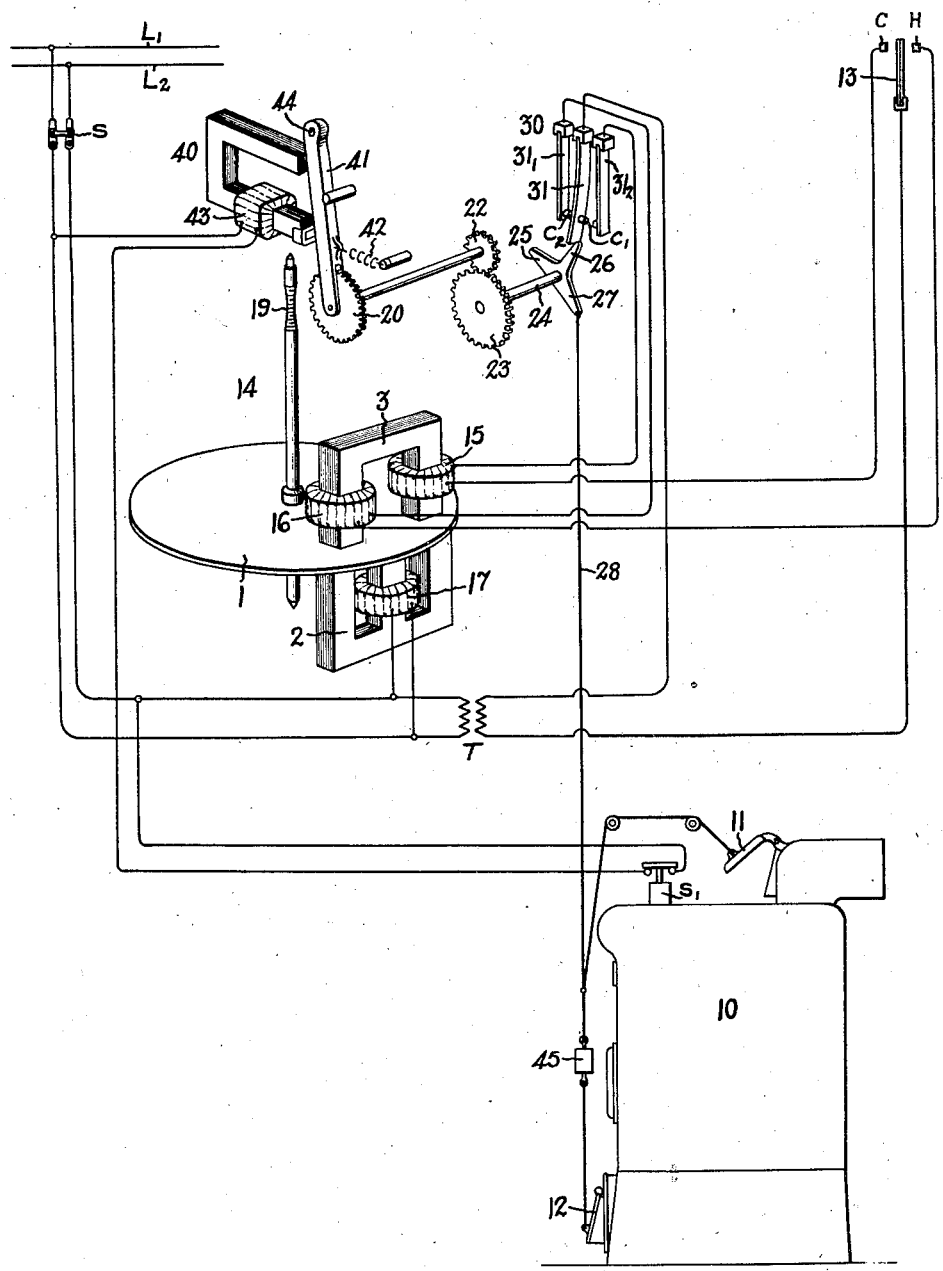
Inventor:
Chester I. Hall,
by Charles V. Tullar
Their Attorney.

Patented Mar. 21, 1933

1,902,327

UNITED STATES PATENT OFFICE

CHESTER I. HALL, OF PHILADELPHIA, PENNSYLVANIA, ASSIGNOR TO GENERAL ELECTRIC COMPANY, A CORPORATION OF NEW YORK

CONTINUOUS HEAT REGULATOR

Application filed October 8, 1929. Serial No. 398,252.

My invention relates to control devices for maintaining constant conditions; more particularly to heat regulating and balancing devices.

The invention particularly concerns a slow acting reversible regulating means which through its control of the heat source produces a constant mean temperature in response to a thermostat.

Although the specific embodiment shows a furnace draft control, the invention is readily applicable to control jets, valves, or similar devices which control a heat source. The device is applicable to bring about a balanced condition between a heat flow from a source of supply to a room and the flow of heat from the room due to radiation.

In previous devices of this character, there is an inherent lag between variation in the heating action of the heating means and the resulting change in temperature of the medium heated thereby. There is also, as a rule, an inherent lag in the response of the heating means to any control of the heating action thereof. This is particularly true of combustion furnaces having automatic damper control devices such as commonly used in domestic or house heating systems. In the customary device, the dampers are either opened wide or closed almost instantaneously in response to a thermostatic control. This causes over-shooting of temperature, as well as loss of fuel and heat, since after having been opened and the intensity of the fires increased, the sudden shutting of the damper and opening of the check forces out large amounts of unconsumed gas and waste heat. With the damper closed, the fire is reduced in intensity to a point below that required to maintain a substantial constant room temperature, and since there is a lag in the cooling off of the room due to radiation, the fire will have receded to a point much below that required before the thermostat again calls for open dampers.

The present invention obviates the above difficulties so as to provide a substantially constant room temperature.

A furnace damper regulating device embodying a preferred form of the invention consists essentially of a reversible, slow speed induction disc motor connected through reduction gearing to a damper opening link. The motor is connected to a thermostat having a double action. Briefly, the general arrangement is such that upon initial operation of the heating system the thermostat sets the slow speed motor into operation to move the dampers to the full open position. As soon as the proper room temperature is obtained, the thermostat opens, thus stopping the operation of the motor. In case the room temperature should continue to increase, the thermostat closes in the opposite direction to cause the motor to operate in the reverse direction and thereby close the damper. Due to the slow operation of the damper through the reduction gearing, the thermostat under normal operating conditions will function to stop the motor before the closing of the damper is completed, thus stopping all motion of the regulating device. These gradual opening and closing movements of the damper alternately take place, until a mean position is reached by the damper, which position is determined by the heat radiation of the room to be heated, the position of the damper being at a point intermediate the full open and closed positions. Thus, a continuous control of the heat-producing means results, so that the amount of heat produced is exactly balanced by the radiation from the place to be heated.

A safety device for voltage failure is inserted in the apparatus, which disconnects the reduction gearing from the motor upon failure of voltage, permitting the damper quickly to return to closed position should the voltage fail while the damper is open.

A second safety device is present at the furnace for opening the circuit through the undervoltage releasing device in case a dangerous heating condition is reached, thus again permitting rapid closing of the damper.

A preferred embodiment of the invention is illustrated in the accompanying drawing which shows a reversible slow speed induction motor, thermostatically controlled and the damper controlling apparatus operatively connected to said motor.

Referring to the diagrammatic drawing, 10 designates an ordinary steam house heating furnace equipped with a main damper 12 and a check damper 11. 14 designates a reversible, slow speed induction motor having thereon a coil 17 directly connected to the line $L_1$, $L_2$, through switch S and coils 15 and 16 oppositely disposed and connected through a thermostat 13 and transformer T to the line $L_1$, $L_2$.

The dampers 11 and 12 are operatively connected to induction motor 14 through gearing 19, 20, 22 and 23. The shaft 24 carries the two arms 25 and 26 and link 27 attached to the dampers through element 28. The two arms operate in connection with limit switch 30 to limit the rotation of the induction motor 14 in the opening and closing of the dampers. Energization of coil 16 will cause rotation of the motor to open the damper; energization of coil 15 will cause rotation to close the damper.

Connected in the circuit of these two coils is the limiting switch 30, carrying contacts $C_2$ and $C_1$. These contacts are mounted on spring members $31_1$ and $31_2$. Upon reaching either limit, the arms 25 or 26 contact with spring element 31 to open the contacts $C_2$ or $C_1$, thus opening the circuit through either coils 15 or 16 and stopping rotation of the motor 14.

The thermostat 13 is of the usual construction, which will permit closing of its contacts H or C at certain temperature limits.

Mounted adjacent to the induction motor 14 is a magnetically-operated undervoltage control device 40 mechanically connected to the reduction gear train by means of a pivoted arm 41, carrying gear 20, which arm is acted upon by spring 42. When normally energized the undervoltage device 40 operates to connect induction motor 14 to the gearing. Upon voltage failure the arm 41 is released, thereby disconnecting the gearing from the motor and permitting the weight 45 to close the dampers. Connected in the energizing circuit of the undervoltage device 40 is a safety pressure switch $S_1$ mounted on furnace 10. This device operates to open the circuit through a coil 43 of the device 40 when a dangerously high pressure obtains in the furnace boiler, thereby permitting the weight 45 to close the dampers.

S is a switch to connect the apparatus to the line $L_1$, $L_2$.

The particular form of reversible induction disk motor 14 illustrated consists of a disk 1, the U-shaped core 3 carrying coils 15, 16 on one side of the disk, and the E-shaped core 2 carrying coil 17 on its middle leg on the opposite side of the disk. The coil 17 is continuously energized from the line $L_1$, $L_2$. The coils 15 and 16 are energized through transformer T only when one of the contacts H or C of the thermostat 13 is closed. The flux produced by coil 17 and by either coil 15 or 16 induces eddy currents in the disks, for causing rotation thereof. Cores 2 and 3 are so disposed that the interaction between the eddy currents and the induced flux is such that a resultant torque in one or the other direction will be produced, dependent upon which of the coils 15 or 16 is energized.

Upon initial operation of the thermostat in a cold room, the thermostat 13 will close contact H, thereby energizing the coil 16 to cause rotation of the induction motor 14 through the reduction gearing to open the damper 12. Unless the proper room temperature has been reached to cause the thermostat to open, the limit switch 30 will open the circuit through coil 16 when the damper has been fully opened thus stopping the motor. When the temperature in the room to be heated reaches the predetermined point, thermostat 13 will open. In case the furnace further increases the room temperature, thermostat 13 will close on contact C. This will close the circuit through coil 15 to rotate the motor in the opposite direction to close the damper.

Due to the fact that the driving means operates very slowly, the damper will be very gradually closed, thereby reducing the intensity of the fire. Less heat then being furnished, the temperature of the room will finally reach a point which will cause the thermostat to open, thus stopping rotation of the induction motor and holding the damper at some intermediate position between full open and full closed position. Of course should the damper completely close before this lower temperature is reached by the room, the limit switch will open the motor circuit to stop it. After very little oscillating back and forth, some substantially mean position will be reached by the damper door, which will cause the amount of heat furnished by the furnace to the room to balance the amount of heat lost due to radiation from the room. Due to this balanced condition, a very small variation, if any, results in the room temperature. Thus, it will be seen that the automatic self-balancing heat regulator produces an even temperature.

Should the voltage fail with the damper open, if there were no safety device a dangerous condition would be reached by the furnace. To provide against this contingency, a safety device 40 is connected across the line $L_1$, $L_2$. Upon failure of voltage, the arm 41 is released and spring 42 causes this arm to be moved about its pivot 44, thus disconnecting the gear train. To further provide against excess boiler pressure, a safety switch $S_1$ normally closed and mounted on the furnace is connected in the coil circuit 43 of the safety device 40. Should any excess pressure result from unforeseen conditions, switch $S_1$ will open the circuit through coil 43, thus again releasing the gear train. In either of these two contingencies, the releasing of the gear train will permit the damper door to close of its own weight and open the check damper.

From the above description of my apparatus, it will be seen that, due to the very slow speed of the motor and associated gearing, a balanced condition is readily obtained, and overshooting and undershooting of room temperature reduced to a minimum.

What I claim as new and desire to secure by Letters Patent of the United States, is:

1. In a heat control device, a movable heat regulating member, a thermostatically controlled reversible motor for operating the member each way to a position dependent upon heating conditions, releasable operating connections between said motor and said member, means for independently moving the member upon release of said connections, and automatic means for controlling said releasable operating connections to release the same and effective to re-establish said connections to permit the motor to return the member to said position after said connections have been released independently of the relative positions of the motor and member.

2. In a heat control device, a movable heat regulating member having definite limits of operation, means for biasing the member to one of said limits, a reversible electric motor for operating said regulating member, thermostatic switching means for controlling said motor to effect movement of said member to a position between said limits dependent upon predetermined heating conditions, releasable operating connections between the regulating member and the motor, and automatic means for releasing said connections to permit operation of the member in accordance with its bias independently of the motor upon the occurrence of predetermined abnormal conditions and effective to re-establish said operating connections under normal conditions to permit the motor to return the member to the position determined by said thermostatic means.

3. In a heat control device, a movable heat regulating member having definite limits of operation and biased to one of said limits, a thermostatically controlled reversible motor for operating said regulating member each way to a position between said limits dependent upon heating conditions, releasable operating connections between the regulating member and the motor, and automatic means for releasing said connections to permit operation of the member in accordance with its bias independently of the motor upon the occurrence of predetermined abnormal conditions and effective to re-establish the operating connections between the member in its biased position and said motor independently of the relative position of said motor to permit the motor to return the member to said position.

4. In an automatic heat control device for maintaining a substantially constant temperature, a reversible slow speed induction disk motor, a shaft, a damper operating lever mounted on said shaft and movable between maximum and minimum limits, said lever being biased to the minimum limit, reduction gearing between said motor and said shaft to raise or lower said lever, and a thermostat controlling said motor to maintain said lever at some position intermediate its limits of movement, said intermediate position being determined by the heat required at the thermostat to maintain a substantially constant temperature, and an undervoltage device connected to said gearing and operable to unmesh the gearing to disconnect the lever from said motor upon failure of voltage and thereby permit said lever to return to its minimum limit.

5. In a heat control device, a movable heat regulating member having definite limits of operation and biased to one of said limits, a reversible motor for operating said regulating member each way between said limits, releasable operating connections between the regulating member and the motor, said connections being effective in each of a multiplicity of operating relationships, automatic means for releasing said connections to permit operation of the member in accordance with its bias independently of the motor upon the occurrence of predetermined conditions and effective to re-establish said operating connections between said member and said motor in any of said operating relationships.

6. In a heat control device, heat control means having a movable regulating member, means for biasing said member to a predetermined safety position, a motor, connections between said motor and said member for moving said member to any one of a plurality of positions and heat responsive means for controlling movement of said member to any one of said positions, and a safety device to disconnect said member from said motor to insure operation of said member to the safety position upon the occurrence of dangerous heat conditions, said connections being automatically reestablished thereafter.

7. In a heat control device, in combination, an electric motor, a heat control means, driving connections between said motor and said control means, a voltage responsive device for breaking said driving connections upon failure of voltage, means for effecting a predetermined operation of said control means upon release of said connections, and a safety device for independently controlling said voltage responsive device for breaking said driving connections upon the occurrence of dangerous heat conditions.

8. In a heat control device, a motor, a damper regulator, reduction gearing between said motor and said damper regulator, and a voltage responsive device for unmeshing said gearing to disconnect said motor from said damper regulator, and a safety device for independently controlling said voltage responsive device to unmesh said gearing upon the occurrence of dangerous heat conditions.

9. In a heat control device, a motor, a regulator biased to a predetermined position, reduction gearing between said motor and said regulator, and a voltage responsive device connected thereto and operable to disconnect said reduction gearing from said motor to permit operation of said regulating means to said biased position upon failure of voltage, and a safety device for independently controlling said voltage responsive device to unmesh said gearing upon the occurrence of dangerous heat conditions.

10. In a heat control device, the combination of a motor, a regulating means, reduction gearing between said motor and said regulating means for moving said regulating means to any one of a plurality of positions and heat responsive means for controlling movement of said means to any one of said positions, a magnetically operated voltage failure device connected to said gearing and operable to disconnect said gearing from said motor to insure a predetermined operation of said regulating means upon failure of voltage, and a switch operable in response to predetermined conditions to deenergize said voltage failure device to disconnect said gearing, said switch after said conditions have passed automatically returning to energizing position.

11. In an automatic heat control device for maintaining a substantially constant temperature, a reversible slow speed induction disk motor, a damper movable between maximum and minimum limits and biased to the minimum limit, a shaft, a lever mounted thereon and connected to raise and lower said damper, reduction gearing connecting said motor and said shaft, a double contact thermostat controlling the reversing, starting and stopping of said motor to operate said damper to a position intermediate its limits of movement determined by the heat required at the thermostat to maintain a substantially constant temperature, a limit switch for said motor to limit movement of said damper, and a voltage responsive device having a movable armature connected to unmesh said gearing and thereby disconnect said damper from said motor to insure operation of said damper to the minimum limit upon failure of voltage, and a safety switch connected to deenergize said voltage responsive device to insure operation of said damper to the minimum limit upon the occurrence of predetermined conditions.

12. An automatic self-balancing heat control device having in combination, a movable heat regulating member having definite limits of operation and biased to one of said limits, a reversible electric motor for operating said regulating member each way between said limits, releasable operating connections between the regulating member and the motor, a heat responsive device for controlling said motor to position and maintain said heat regulating member in an intermediate position between said limits to balance the heat supply to the heat requirements, automatic means for releasing said connections to permit operation of the member in accordance with its bias from said intermediate position independently of the motor upon the occurrence of predetermined conditions, said automatic means being effective to re-establish the operating connections with the member in said biased position and independently of the relative position of the motor whereby said member may be returned to its intermediate position.

13. An automatic self-balancing heat control device for maintaining a constant temperature condition including in combination a movable heat regulating member movable between maximum and minimum limits, a reversible electric motor for operating said regulating member each way between said limits, releasable operating connections between said member and said motor, a heat responsive circuit controlling means for starting, stopping, and reversing said motor to position and maintain said member in a position intermediate said limits so as to balance the heat supply to the heat requirements, and voltage responsive means for releasing the operating connections between said motor and said member to permit operation of said member from said intermediate position in accordance with its bias independently of the motor, said voltage responsive means being effective to re-establish the operating connections between said motor and said member with the member in said biased position and independently of the relative position of the motor to permit the motor to return the member to said intermediate position.

In witness whereof, I have hereto set my hand this 4 day of Oct., 1929.

CHESTER I. HALL.